(12) United States Patent
Nyander et al.

(10) Patent No.: US 10,024,602 B2
(45) Date of Patent: Jul. 17, 2018

(54) METHOD OF MAKING A PLATE PACKAGE FOR A PLATE HEAT EXCHANGER

(71) Applicant: ALFA LAVAL CORPORATE AB, Lund (SE)

(72) Inventors: Anders Nyander, Staffanstorp (SE); Alvaro Zorzin, Romans d'Isonzo (IT); Jens Romlund, Helsingborg (SE); Rolf Bermhult, Lund (SE); Magnus Svensson, Marieholm (SE); Olof Sandstrom, Malmo (SE)

(73) Assignee: ALFA LAVAL CORPORATE AB, Lund (SE)

( * ) Notice: Subject to any disclaimer, the term of this patent is extended or adjusted under 35 U.S.C. 154(b) by 132 days.

(21) Appl. No.: 14/437,954

(22) PCT Filed: Oct. 31, 2013

(86) PCT No.: PCT/EP2013/072797
§ 371 (c)(1),
(2) Date: Apr. 23, 2015

(87) PCT Pub. No.: WO2014/072223
PCT Pub. Date: May 15, 2014

(65) Prior Publication Data
US 2015/0292803 A1 Oct. 15, 2015

(30) Foreign Application Priority Data

Nov. 7, 2012 (EP) .................................... 12191523

(51) Int. Cl.
*F28D 7/00* (2006.01)
*F28F 3/10* (2006.01)
(Continued)

(52) U.S. Cl.
CPC ............ *F28D 7/0066* (2013.01); *B23P 15/26* (2013.01); *F28D 9/005* (2013.01); *F28F 3/10* (2013.01);
(Continued)

(58) Field of Classification Search
CPC ......... Y10T 29/49359; Y10T 29/49366; Y10T 29/49936; Y10T 29/49956; B23P 15/26;
(Continued)

(56) References Cited

U.S. PATENT DOCUMENTS 2,028,456 A * 1/1936 Karmazin ............... F25B 39/04
165/150
2,028,457 A * 1/1936 Karmazin ............... F25B 39/04
165/150
(Continued)

FOREIGN PATENT DOCUMENTS

CN 1127548 A 7/1996
CN 101106503 A 1/2008
(Continued)

OTHER PUBLICATIONS

Office Action (Text of First Office Action) dated May 20, 2016, by the State Intellectual Property Office of People's Republic China in corresponding Chinese Patent Application No. 201380058045.8, English Translation of the Office Action, (12 pages).
(Continued)

*Primary Examiner* — Jason L Vaughan
(74) *Attorney, Agent, or Firm* — Buchanan Ingersoll & Rooney PC

(57) ABSTRACT

A plate package made according to the method includes first heat exchanger plates and second heat exchanger plates. Each heat exchanger plate has a first porthole, and the port hole of at least one of the heat exchanger plates is surrounded by a peripheral rim. The first heat exchanger plates
(Continued)

and the second heat exchanger plates, are joined to each other and arranged side by side in such a way that the peripheral rims together define an inlet channel extending through the plate package. The peripheral rim of the first and/or the second heat exchanger plates has at least one through hole, forming a fluid passage allowing a communication between the inlet channel and the first plate interspaces. The at least one through hole is made in a condition in which the first and the second heat exchanger plates have been joined to each other to form the plate package.

6 Claims, 7 Drawing Sheets

(51) Int. Cl.
  *F28F 9/02* (2006.01)
  *F28D 9/00* (2006.01)
  *B23P 15/26* (2006.01)
  *F28D 21/00* (2006.01)

(52) U.S. Cl.
  CPC ...... *F28F 9/026* (2013.01); *F28D 2021/0071* (2013.01); *F28F 9/0273* (2013.01); *Y10T 29/49359* (2015.01); *Y10T 29/49366* (2015.01)

(58) Field of Classification Search
  CPC ........ F28D 9/0043; F28D 9/05; F28D 9/0056; F28D 9/0075; F28F 3/086; F28F 3/005; B21D 35/001; B21D 28/26; B21D 28/30; B23B 2247/08; B23B 2247/14
  USPC ................... 83/29, 30; 408/1 R; 29/890.051
  See application file for complete search history.

(56) References Cited

U.S. PATENT DOCUMENTS

| | | | | |
|---|---|---|---|---|
| 2,028,458 A * | 1/1936 | Karmazin | F25B 39/04 | 165/132 |
| 2,133,990 A * | 10/1938 | Karmazin | B21D 53/04 | 165/150 |
| 2,511,084 A * | 6/1950 | Shaw | F28D 9/0043 | 165/157 |
| 4,176,567 A * | 12/1979 | Weisberg | B26F 1/14 | 383/200 |
| 4,270,253 A * | 6/1981 | Herb | B23P 13/00 | 269/54.5 |
| 4,310,960 A * | 1/1982 | Parker | B23P 15/26 | 165/166 |
| 4,669,532 A * | 6/1987 | Tejima | F01M 5/007 | 165/103 |
| 4,708,199 A * | 11/1987 | Yogo | F28D 9/0012 | 165/167 |
| 4,839,495 A | 6/1989 | Kitera et al. | | |
| 4,885,836 A * | 12/1989 | Bonomi | B21J 15/10 | 227/51 |
| 5,125,453 A * | 6/1992 | Bertrand | F28D 1/0341 | 165/153 |
| 5,369,883 A * | 12/1994 | So | F28D 9/0043 | 29/890.039 |
| 5,511,612 A * | 4/1996 | Tajima | F28D 9/0012 | 165/167 |
| 5,538,077 A * | 7/1996 | So | F28D 9/0043 | 165/109.1 |
| 5,634,518 A * | 6/1997 | Burgers | F25B 39/024 | 165/153 |
| 5,642,900 A * | 7/1997 | Patel | B60R 21/217 | 112/475.08 |
| 5,794,691 A * | 8/1998 | Evans | F28D 1/0333 | 165/153 |
| 5,924,484 A | 6/1999 | Anderson et al. | | |
| 6,070,428 A * | 6/2000 | Higashiyama | F28D 1/0333 | 165/153 |
| 6,082,449 A * | 7/2000 | Yamaguchi | F28D 9/0075 | 165/153 |
| 6,161,615 A * | 12/2000 | Brieden | F28D 9/005 | 165/166 |
| 6,182,746 B1 * | 2/2001 | Wiese | F28D 9/005 | 165/166 |
| 6,230,794 B1 * | 5/2001 | Bertilsson | B21D 53/04 | 165/167 |
| 6,340,054 B1 * | 1/2002 | Schwarz | F01M 5/002 | 165/153 |
| 6,669,805 B2 * | 12/2003 | Japp | B23B 35/00 | 156/253 |
| 6,814,133 B2 * | 11/2004 | Yamaguchi | F28D 9/0012 | 123/196 A |
| 6,843,311 B2 * | 1/2005 | Evans | F28D 9/005 | 165/109.1 |
| 6,863,122 B2 * | 3/2005 | St. Pierre | F28D 9/0043 | 165/167 |
| 7,017,656 B2 * | 3/2006 | Beddome | F28D 9/0043 | 165/153 |
| 7,152,663 B2 * | 12/2006 | Helin | F28D 9/005 | 165/11.1 |
| 7,246,436 B2 * | 7/2007 | Blomgren | B21D 53/04 | 165/166 |
| 7,485,222 B2 * | 2/2009 | Max | C02F 1/22 | 210/170.11 |
| 7,568,520 B2 * | 8/2009 | Ozawa | F28D 9/0043 | 138/89 |
| 7,600,559 B2 * | 10/2009 | Strahle | F28D 9/0012 | 165/167 |
| 8,167,029 B2 * | 5/2012 | Bertilsson | F28D 9/005 | 165/167 |
| 8,281,849 B2 * | 10/2012 | Grozinger | F28D 9/005 | 165/167 |
| 8,887,796 B2 * | 11/2014 | Christensen | F28D 9/005 | 165/153 |
| 9,250,019 B2 * | 2/2016 | Han | F28D 1/0333 | |
| 9,261,005 B2 * | 2/2016 | Kato | F28F 27/00 | |
| 9,310,136 B2 * | 4/2016 | Andersson | F28D 9/005 | |
| 2001/0010262 A1 * | 8/2001 | Komoda | F28D 9/0043 | 165/167 |
| 2005/0082049 A1 * | 4/2005 | Brost | F28F 9/026 | 165/166 |
| 2006/0115393 A1 | 6/2006 | Reinke et al. | | |
| 2006/0278378 A1 * | 12/2006 | Okura | F28D 9/0043 | 165/140 |
| 2007/0011877 A1 * | 1/2007 | Chen | B23P 15/26 | 29/890.046 |
| 2007/0169916 A1 | 7/2007 | Wand et al. | | |
| 2007/0227716 A1 | 10/2007 | Dahlberg | | |
| 2008/0196873 A1 | 8/2008 | Svensson | | |
| 2008/0196874 A1 | 8/2008 | Bertilsson et al. | | |
| 2010/0319891 A1 * | 12/2010 | Vironneau | B21D 53/04 | 165/167 |
| 2011/0011568 A1 * | 1/2011 | Han | F28D 9/0043 | 165/133 |
| 2011/0174125 A1 * | 7/2011 | Funabiki | B21D 28/02 | 83/13 |
| 2011/0308779 A1 * | 12/2011 | Andersson | F28D 9/005 | 165/170 |
| 2012/0325446 A1 * | 12/2012 | Wakamatsu | F28F 3/044 | 165/167 |
| 2014/0305621 A1 * | 10/2014 | Gaiser | F28F 3/12 | 165/168 |

FOREIGN PATENT DOCUMENTS

| | | | | |
|---|---|---|---|---|
| CN | 101124450 A | 2/2008 | | |
| CN | 102245994 A | 11/2011 | | |
| EP | 1526350 A2 | 4/2005 | | |
| GB | 134277 A | 10/1919 | | |
| JP | 57031797 A | * 2/1982 | ............. F28F 3/086 |
| JP | 57-004392 A | 9/1982 | | |
| JP | 3-121360 U | 12/1991 | | |

(56) References Cited

FOREIGN PATENT DOCUMENTS

| JP | 04-270893 A | 9/1992 |
|----|----|----|
| JP | 04270893 A | 9/1992 |
| JP | 08-273804 A | 10/1996 |
| JP | 2001-099587 A | 4/2001 |
| JP | 2008-536090 A | 9/2008 |
| JP | 2008536090 A | 9/2008 |
| JP | 2012-512379 A | 5/2012 |
| JP | 2012-512380 A | 5/2012 |
| JP | 2012512379 A | 5/2012 |
| JP | 2012512380 A | 5/2012 |
| KR | 1020070011426 A | 1/2007 |
| SE | 8702608-4 | 12/1988 |
| WO | 20060110090 A1 | 10/2006 |
| WO | WO 2009/062738 A1 | 5/2009 |
| WO | 2010069872 A1 | 6/2010 |
| WO | 2010069873 A1 | 6/2010 |
| WO | WO 2010/069872 A1 | 6/2010 |

OTHER PUBLICATIONS

Office Action (Notice of Preliminary Rejection) dated Oct. 19, 2016, by the Korean Intellectual Property Office in corresponding Korean Patent Application No. 10-2015-7014773, and an English translation of the Office Action. (6 pgs).

Eng ish language translation of Japanese Official Action dated Dec. 5, 2016, by the Japan Patent Office in corresponding Japanese Patent Application No. 2015-537307 (3 pages).

Office Action (Translation of the Grounds of the Examination Report) dated Sep. 1, 2015, by the Taiwanese Patent Office in corresponding Taiwanese Application No. 102139925. (10 pages).

International Search Report (PCT/ISA/210) dated Nov. 26, 2013, by the European Patent Office as the International Searching Authority for International Application No. PCT/EP2013/072797.

Written Opinion (PCT/ISA/237) dated Nov. 26, 2013, by the European Patent Office as the International Searching Authority for International Application No. PCT/EP2013/072797.

English translation of Office Action (Notice of Reasons for Rejection) dated Apr. 11, 2016, by the Japanese Patent Office in corresponding Japanese Patent Application No. 2015-537307.

Office Action (Notice of Preliminary Rejection) dated Apr. 20, 2017, by the Korean Patent Office in corresponding Korean Patent Application No. 10-2015-7014773, and an English translation of the Office Action. (4 pgs).

* cited by examiner

METHOD OF MAKING A PLATE PACKAGE FOR A PLATE HEAT EXCHANGER

TECHNICAL FIELD

The present invention refers generally to a method of making a plate package for a plate heat exchanger and such a plate package. Further it relates to a plate heat exchanger comprising such a plate package and the hole making in such a plate package.

BACKGROUND ART

The present invention refers generally to a method for making a plate package to be used in a plate heat exchanger, in particular a plate heat exchanger in the form of an evaporator, i.e. a plate heat exchanger designed for evaporation of a fluid in a refrigeration system. The refrigeration system may by way of example be an air conditioning system, a cooling system or a heat pump system. Normally, such a refrigeration system comprises in addition to the evaporator, a compressor, a condenser and an expansion valve, all of which are coupled in series. It goes without saying that the plate package may also be used for distribution of other fluids, such as steam in steam evaporators.

A typical plate heat exchanger includes a plate package, with a number of first heat exchanger plates and a number of second heat exchanger plates, which are joined to each other and arranged side by side in such a way that a first plate interspace is formed between each pair of adjacent first heat exchanger plates and second heat exchanger plates and a second plate interspace between each pair of adjacent second heat exchanger plates and first heat exchanger plates. The first plate interspaces and the second plate interspaces are separated from each other and provided side by side in an alternating order in the plate package. Substantially each heat exchanger plate has at least a first porthole and a second porthole, wherein the first portholes form a first inlet channel to the first plate interspaces and the second portholes form a first outlet channel from the first plate interspaces.

In a plate package of this kind, the plates are often brazed, bonded or welded together. However, gaskets may also be used as a sealing means between adjacent heat exchanger plates.

The fluid, i.e. the refrigerant supplied to the inlet channel of such a plate heat exchanger for evaporation is usually present both in a gaseous state and a liquid state. This is known as a two-phase evaporator. It is difficult to provide an even or optimal distribution of the fluid to the different plate interspaces in such a way that e.g. an even or optimized quantity of fluid is supplied and flows through each plate interspace. One reason for this may be that the fluid, after having passed through the expansion valve, is already partly evaporated when it enters the inlet channel, and does not remain in the state of a homogenous liquid/vapour mixture during the passage along the whole length of the inlet channel, but tends to partly separate into streams of liquid and vapour, respectively.

Uneven distribution of fluid to the different evaporation flow paths in the plate heat exchanger results in ineffective use of parts of the plate heat exchanger. Moreover, the fluid may become unnecessarily overheated. Furthermore, some channels may be flooded by liquid fluid and there is also a risk that some liquid may be present at the outlet. The latter should be avoided due to a risk of liquid entering the compressor.

In order to avoid the problem of uneven distribution of the fluid in a plate heat exchanger of the above mentioned type it has previously been suggested in SE 8702608-4 to arrange a restriction means in each passage between the inlet channel of the plate heat exchanger and each plate interspace forming an evaporation flow path for the fluid. The restriction means could be a ring or a washer provided with a hole and being arranged between adjacent pairs of the heat transfer plates around the port hole. Alternatively, the restriction means could be a pipe provided with multiple holes or apertures and being arranged in the inlet channel of the plate heat exchanger. As a further alternative it has also been suggested in SE 8702608-4 to create restriction means as an integral part of the heat transfer plates by folding the plate edge portions delimiting the inlet ports of two adjacent heat exchanger plates to abutment against each other, edge to edge. In a small area however, inlet openings are formed allowing fluid to pass into the flow paths between adjacent plates.

Plate heat exchangers provided with restriction means of the above mentioned kind give rise to several difficulties during the manufacture thereof. The use of separate rings or washers has resulted in problems with the location of the rings or washers in the correct positions when a plate heat exchanger is assembled. A restrictions means in the form of a pipe has the disadvantage that it must have a length adapted to the number of heat exchanger plates included in the plate package and it must also be correctly positioned in relation to the inlet passages leading into the flow paths between the heat exchanger plates. Folding of port edge portions of the plates has also been shown to be unpractical, depending on the fact that it is difficult to obtain well defined inlet openings leading into the plate interspaces as proposed in SE 8702608-4.

WO2010/069872A1 relates to the problem of designing a plate heat exchanger that is rigid enough to withstand the high coolant pressure that is used when using carbon dioxide as a coolant. The document provides a solution to the fact that brazed heat exchangers tend to break close the port openings if subjected to high pressures, since the tearing apart force is highest around the port openings. The document discloses a brazed heat exchanger wherein each heat exchanging plate is provided with a port skirt at least partly surrounding the port opening. As the heat exchanger plates are stacked the port skirts are overlapping one another to thereby form a pipe like configuration. The port skirts are provided with preformed holes to thereby minimize the pressure drop of the fluid during its passage through the port openings.

Yet another solution is disclosed in US 2008/0196874 in which the individual heat exchanger plates are provided with a collar surrounding the port hole. By the collars, a smooth inlet channel is formed when the heat exchanger plates are stacked to form a plate package. The sealing area in at least one of two adjacent plates may be provided with at least one narrow recess or groove forming an inlet passage allowing a flow of fluid from the inlet channel into the plate interspaces. Again, by the brazing there is a clear risk that the recesses or grooves are blocked by solder, which provides an uncontrolled and unpredictable flow pattern. Further, due to practical and economical reasons, the freedom to design and optimize the plate heat exchanger in view of a specific customer's needs is limited in terms of the number and the position of the through holes distributing the fluid.

SUMMARY

The object of the present invention is to provide an improved method of making a plate package to be used in a plate heat exchanger remedying or at least alleviating the problems and drawbacks mentioned above.

The method of making the plate package should be easy and cost effective.

Further, the method of making the plate package should allow a large freedom while designing the same depending on size and intended efficiency, i.e. adaption of the plate heat exchanger to a specific customer's needs. As mentioned above, a very important parameter in that work is the provision of an even distribution of the fluid to the various evaporation flow paths between the heat exchanger plates.

Yet another object is to allow to a large extent the use of off the shelf heat exchanger plates.

This object is achieved by a method of making a plate package for a plate heat exchanger, the method comprising the steps of providing a number of first heat exchanger plates and a number of second heat exchanger plates, each heat exchanger plate having a first porthole, wherein said port hole of at least one of the heat exchanger plates is surrounded by a peripheral rim, arranging the first heat exchanger plates and the second heat exchanger plates side by side in an alternating order in which, the peripheral rims together define an inlet channel extending through the first and the second heat exchanger plates, joining said first and second heat exchanger plates with each other to form the plate package.

The method is characterized in making, in a condition in which the first and the second heat exchanger plates have been joined to each other at least one through hole in the peripheral rims of the first and/or the second heat exchanger plates.

Throughout this document the term peripheral rim will be used. The term peripheral rim should be understood as a collar, which collar may be a part integrally formed with the heat exchanger plate, or a separate part permanently joined with the heat exchanger plate. In case of the latter, the radial thickness or the peripheral rim may be different than that of the base material of the heat exchanger plate. It also goes without saying that the material of the peripheral rim may be different than that of the base material of the heat exchanger plate.

By making the at least one through hole when the heat exchanger plates have been joined to form the plate package, a number of important advantages are offered.

The heat exchanger plates do not have to be custom made in view of the number of through holes and their positions in the individual heat exchanger plates, but may rather be off the shelf products. This facilitates the production of the plate package as such. Also it facilitates the stacking procedure of the heat exchanger plates since the identity of any individual custom made plates may be put aside.

By the method the plate package may, with a very high degree of flexibility and accuracy, be adapted to the specific customer's needs in terms of positioning the through hole in a pattern providing the optimum distribution of fluid throughout the first interspaces of the plate package. This optimization may be based on computer made flow simulations. As will be discussed below, the positioning of the through holes to get an optimized flow/operation is known to be a very complex issue. Further, by making the at least one through hole after joining the individual heat exchanger plates, the through holes thus formed will always have a well defined cross section and a well defined passage without any clogging from solder etc.

The at least one through hole may be made by a thermal process using a laser beam process, an electron beam process or a plasma process. Furthermore, the at least one through hole may be made by a mechanical process using a punching process or a drilling process.

These methods allow the hole making process to be based on numerical models resulting from advanced simulations, such as flow simulations and simulations of movement of nozzles, mirrors and optics required for the thermal process. Further, the methods allow a high degree of control of the power required depending on parameters such as the thickness of material to penetrate, while still not affecting the surrounding material.

According to another aspect, the invention relates to a plate package for a plate heat exchanger made according to the method, said plate package including a number of first heat exchanger plates and a number of second heat exchanger plates, which are joined to each other and arranged side by side in such a way that a first plate interspace is formed between each pair of adjacent first heat exchanger plates and second heat exchanger plates, and a second plate interspace between each pair of adjacent second heat exchanger plates and first heat exchanger plates, wherein the first plate interspaces and the second plate interspaces are separated from each other and provided side by side in an alternating order in the plate package, wherein each heat exchanger plate has a first porthole wherein said port hole of at least one of the heat exchanger plates is surrounded by a peripheral rim, the first heat exchanger plates and the second heat exchanger plates are joined to each other and arranged side by side in such a way that the peripheral rims together define an inlet channel extending through the plate package, and the peripheral rim of the first and/or the second heat exchanger plate has at least one through hole, forming a fluid passage allowing a communication between the inlet channel and the first plate interspaces.

The plate package is characterized in that the at least one through hole is made in a condition in which the first and the second heat exchanger plates are joined to each other to form the plate package.

The peripheral rim may be a flanged portion formed integrally with the heat exchanger plate. The peripheral rim may thus be formed while forming the heat exchanger plate or in a separate step. The longitudinal extension of the flanged portion as seen in the longitudinal extension of the inlet channel depends on parameters such as ductility of the heat exchanger plate material and the design of the press tools used.

The peripheral rim may be a rim shaped item permanently joined with the heat exchanger plate. The joining to the heat exchanger plate may be made by any suitable method such as brazing, welding, bonding or adhesives. It is to be understood that the rim shaped item may be made by other material and with another thickness than the heat exchanger plate as such.

The heat exchanger plates in the plate package may be joined to each other through brazing, welding, adhesive or bonding. It is to be understood that the joining may be permanent. In case of the peripheral rim being a rim shaped item permanently joined to the heat exchanger plate, that may be made while joining the heat exchanger plates of the plate package to each other.

The at least one through hole in each peripheral rim may be arranged in a portion thereof having a thickness of material corresponding to the thickness of material of one single heat exchanger plate or in a portion thereof having a thickness of material corresponding to the thickness of material of two or more heat exchanger plates.

The peripheral rims may be arranged to form a lap joint having a longitudinal extension essentially in parallel with the longitudinal extension of the inlet channel or essentially perpendicular to the longitudinal extension of the inlet channel.

In case of an essentially parallel extension, an inlet channel having an essentially smooth envelope surface may be formed. It goes without saying that the resulting lap joints having a parallel extension may be formed with the free edges of the flanged portions of the peripheral rims being oriented in the same direction or being oriented facing each other.

The peripheral rims may have a free edge portion, and wherein a first and a second heat exchanger plate making up a pair of adjacent first and second heat exchanger plates may be so mutually joined that the free edge portions are arranged in the same direction in an at least partly overlapping condition; in the opposite directions in an at least partly overlapping condition; or in the opposite directions in an abutting condition. It goes without saying that the plates within one and the same plate package may be joined with a mixture of lap joints and butt joints.

The peripheral rims may have a flanged portion, and the flanged portion of the first heat exchanger plate in a first pair of first and second heat exchanger plates may be arranged to at least partly overlap the flanged portion of the second heat exchanger plate in the first pair of first and second heat exchanger plates, and wherein the flanged portion of the second heat exchanger plate in the first pair of first and second heat exchanger plates may be arranged to at least partly overlap the flanged portion of a first heat exchanger plate in a second, adjacent pair of first and second heat exchanger plates.

The peripheral rims may have a flanged portion, and the flanged portion of the first heat exchanger plate in a first pair of first and second heat exchanger plates may be arranged in an at least partly overlapping condition with the flanged portion of the first heat exchanger plate in a second adjacent pair of first and second heat exchanger plates.

The peripheral rims may have a flanged portion, and the flanged portion of the first heat exchanger plate in a first pair of first and second heat exchanger plates may be arranged to at least partly overlap the flanged portion of the second heat exchanger plate in the first pair of first and second heat exchanger plates.

According to another aspect, the invention relates to a plate heat exchanger comprising a plate package in line with any of the embodiments given above.

According to yet another aspect, the invention relates to the use of a laser beam process, an electron beam process or a plasma process for the purpose of making at least one through hole in the inlet channel of a plate package, the at least one through hole being made in a condition in which the heat exchanger plates making up the plate package have been joined with each other. This offers a number of advantages that previously have been discussed in view of the inventive plate package as such. To avoid any undue repetition, reference is made to the discussion above.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1 discloses schematically a side view of a typical plate heat exchanger.

DETAILED DESCRIPTION

Figure 1:
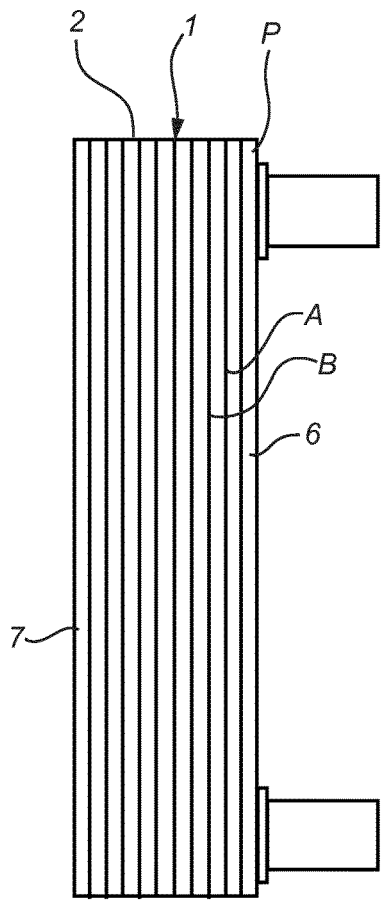
Figure 2:
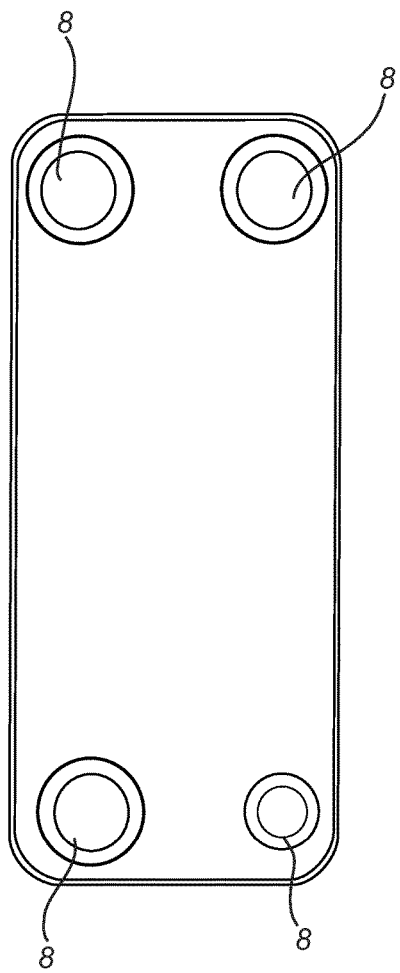
FIG. 2 discloses schematically a front view of the plate heat exchanger in FIG. 1.
Figure 3:
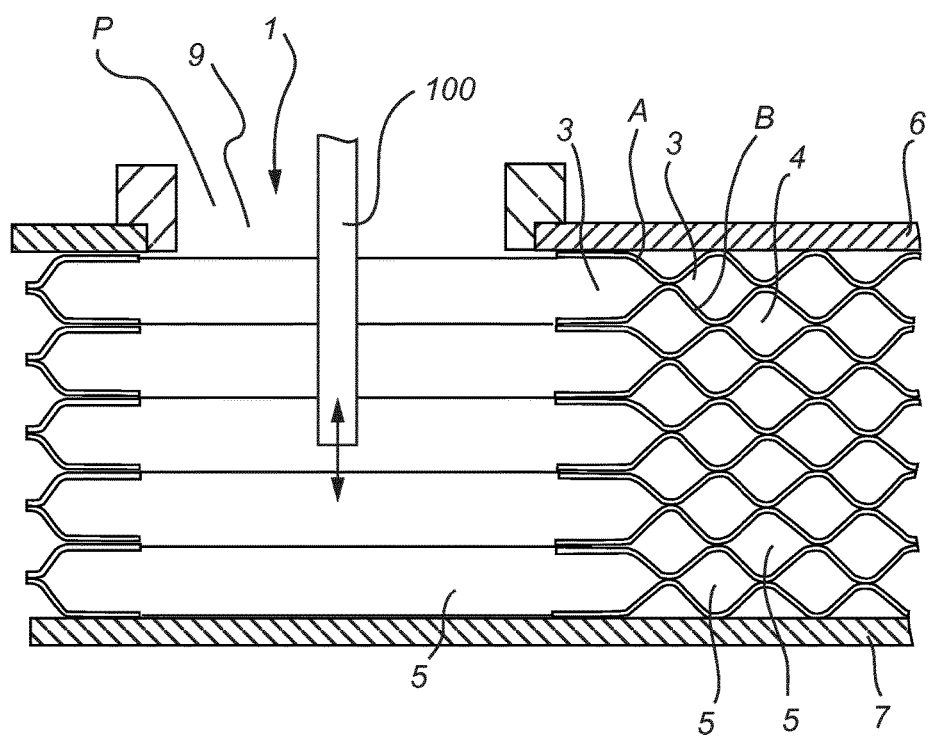
FIG. 3 discloses schematically a cross section of an inlet or outlet channel of a plate heat exchanger.

FIGS. 1 to 3 disclose a typical example of a plate heat exchanger 1. The plate heat exchanger 1 includes a plate package P, which is formed by a number of heat exchanger plates A, B, which are provided side by side of each other. The plate heat exchanger 1 comprises two different types of heat exchanger plates, which in the following are called the first heat exchanger plates A, see FIGS. 3 and 4, and the second heat exchanger plate B, see FIGS. 3 and 5. The plate package P includes substantially the same number of first heat exchanger plates A and second heat exchanger plates B. As is clear from FIG. 3, the heat exchanger plates A, B are provided side by side in such a way that a first plate interspace 3 is formed between each pair of adjacent first heat exchanger plates A and second heat exchanger plates B, and a second plate interspace 4 between each pair of adjacent second heat exchanger plates B and first heat exchanger plates A.

Every second plate interspace thus forms a respective first plate interspace 3 and the remaining plate interspaces form a respective second plate interspace 4, i.e. the first and second plate interspaces 3, 4 are provided in an alternating order in the plate package P. Furthermore, the first and second plate interspaces 3 and 4 are substantially completely separated from each other.

A plate heat exchanger 1 may advantageously be adapted to operate as an evaporator in a cooling agent circuit, not disclosed. In such an evaporator application, the first plate interspaces 3 may form first passages for a first fluid being a refrigerant whereas the second plate interspaces 4 may form second passages for a second fluid, which is adapted to cooled by the first fluid.

The disclosed plate package P is provided with an upper end plate 6 and a lower end plate 7, which are provided on a respective side of the plate package P.

In the embodiment disclosed, the heat exchanger plates A, B and the end plates 6, 7 are permanently joined to each other. Such a permanent joining may advantageously be performed through brazing, welding, adhesive or bonding. During joining by means of brazing a suitable number of heat exchanger plates are typically stacked on each other with a solder (not shown) in the shape of a thin sheet, disc or paste located between adjacent heat exchanger plates A, B, and subsequently the whole plate package P is heated in an oven until said solder melts. This will result in a permanent joint between bearing contact surfaces.

Figure 4:
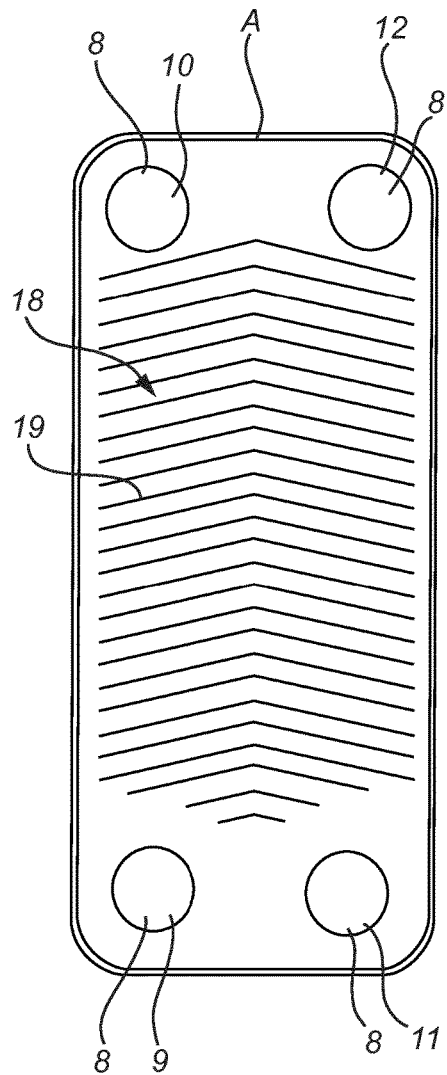
FIG. 4 discloses highly schematically the front side of a typical first heat exchanger plate.
Figure 5:
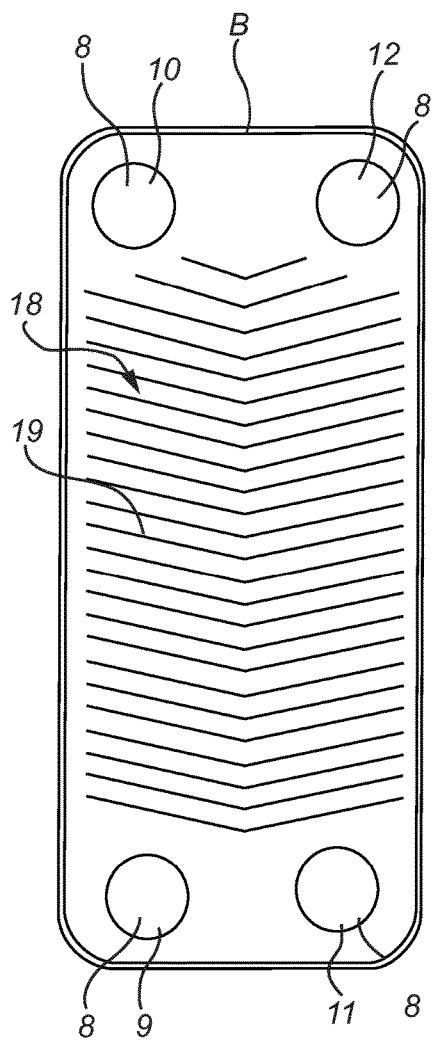
FIG. 5 discloses highly schematically the front side of a typical second heat exchanger plate.

As appears from especially FIGS. 2, 4 and 5, substantially each heat exchanger plate A, B has four portholes 8. The first portholes 8 form a first inlet channel 9 to the first plate interspaces 3, which extends through substantially the whole plate package P, i.e. all plates A, B and the upper end plate 6. The second portholes 8 form a first outlet channel 10 from the first plate interspaces 3, which also extends through substantially the whole plate package P, i.e. all plates A, B and the upper end plate 6. The third portholes 8 form a second inlet channel 11 to the second plate interspaces 4, and the fourth portholes 8 form a second outlet channel 12 from the second plate interspaces 4. Also these two channels 11 and 12 extend through substantially the whole plate package P, i.e. all plates A, B and the upper end plate 6. The four portholes 8 are in the disclosed embodiment provided in the proximity of a respective corner of the substantially rectangular heat exchanger plates A, B. It is however to be understood that other positions are possible, and the invention should not be limited to the illustrated and disclosed positions.

In a central area of each heat exchanger plate A, B there is an active heat transfer area 18, which is provided with a corrugation 19 of ridges and valleys in a manner known per se. The heat transfer area 18 may of course have other kinds of patterns or even no pattern at all.

Figure 6:
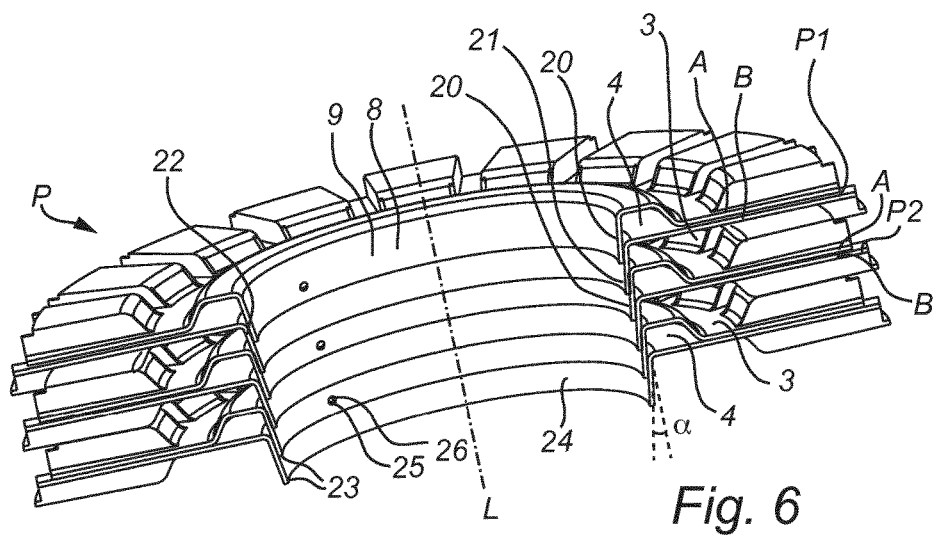
FIG. 6-9 disclose four different embodiments of a cross section of the inlet channel of a plate package according to the invention.

Now turning to FIG. 6, a first embodiment of a plate package P according to the invention will be discussed. More precisely, FIG. 6 discloses a portion in and around the first inlet channel 9. In line with the prior art plate heat exchanger discussed above, a plurality of heat exchanger plates A, B are provided side by side in such a way that a first plate interspace 3 is formed between each pair of adjacent first heat exchanger plates A and second heat exchanger plates B, and a second plate interspace 4 between each pair of adjacent second heat exchanger plates B and first heat exchanger plates A. Every second plate interspace thus forms a respective first plate interspace 3 and the remaining plate interspaces form a respective second plate interspace 4. Thus, the first and second plate interspaces 3, 4 are provided in an alternating order in the plate package P. Furthermore, the first and second plate interspaces 3 and 4 are substantially completely separated from each other.

Each first porthole 8 of each heat exchanger plate A, B may be surrounded by a peripheral rim 20 in the form of a flanged portion 21 integrally formed with the respective heat exchanger plate A, B. Thus, the peripheral rim 20 is formed while forming the heat exchanger plate as such. It is to be understood that the peripheral rim 20 equally well may be a rim shaped item which is permanently joined with the heat exchanger plate. Such joining may be made while joining the heat exchanger plates A, B to form the plate package P. The joining may also be made as a separate step before stacking the heat exchanger plates A, B.

The first and second heat exchanger plates A, B are so stacked that the peripheral rim 20 of a the first heat exchanger plate A in a first pair P1 of first and second heat exchanger plates A, B is arranged in an at least partly overlapping condition with the peripheral rim 20 of the second heat exchanger plate B in the first pair P1 of first and second heat exchanger plates A, B. The peripheral rim 20 of the second heat exchanger plate B in the first pair P1 of first and second heat exchanger plates A, B is arranged to at least partly overlap the peripheral rim 20 of a first heat exchanger plate A in a second, adjacent pair P2 of first and second heat exchanger plates A, B. Thereby the overlapping relationship form lap joints 22 extending in the circumferential direction of the inlet channel 9. Further, the lap joints 22 have a longitudinal extension essentially corresponding to the longitudinal extension L of the first inlet channel 9. Further, the free edges 23 of the peripheral rims 20 are all directed essentially in the same direction in parallel with the longitudinal extension L of the first inlet channel 9. Thereby an essentially smooth envelope surface 24 of the inlet channel 9 is created. The free edges may be oriented to face an intended downstream flow or an intended upstream flow through the inlet channel 9.

It is to be understood that to allow this kind of overlapping, the flanged portion 21 of the peripheral rim 20 forms a small angle α in view of the longitudinal extension L of the first inlet channel 9. The angle α may by way of a non limiting example be within the range of 5-25 degrees and more preferred within the range of 7-12 degrees. The suitable angle α is depending on parameters such as pressing depth, which in turn depends on base material and design of a pre-cut hole (not shown) which is used to form the inlet channel 9. It goes without saying that in case of the peripheral rim being a separate item joined with the heat exchanger plate the angle α may be as low as 0 to 10 degrees.

The overlapping distance in the lap joint 22 as seen in the longitudinal extension L of the inlet channel 9 should preferably be large enough to provide for a tight joint. By a tight joint is meant that no fluid flow should be allowed through the envelope surface 24 of the inlet channel via the joints. Typically, as a non-limiting example the overlapping distance of the joint may be in the range of 1-3 mm. Influencing parameters are by way of example tolerances during the pressing, any spring back, type of material in the base material, type of joining method etc.

The lap joint 22 is formed while forming and joining the plate package P as such. Preferably it is made by using the same joining method, i.e. brazing, welding, adhesive or bonding as used when joining the plate package P. Thus, the lap joint 22 is to be regarded as a permanent joint. It should be stressed that the joining material, such as the solder, is not illustrated in FIG. 6.

A number of through holes 25 are arranged in the flanged portion 21 of the peripheral rim 20 of the first or the second heat exchanger plates A, B. The through holes 25 do each form a fluid passage 26 allowing a communication between the inlet channel 9 and the first plate interspaces 3.

The through holes 25 may be made in a portion of the peripheral rim 20 and its flanged portion 21 having a thickness of material corresponding to the thickness of material of one single heat exchanger plate A, B. It is also to the understood that the through holes 25 may be made to extend through a double thickness of material, which is the case if the through hole is made in the overlapping area of the lap joint 22. Even a triple thickness of material may in some circumstances be possible. It is to be understood that a single thickness material is preferred in terms of the energy required to penetrate the material during the hole making process. Also, the thinner material of thickness, the more uniform cross section along the longitudinal extension of the through hole 25 is provided for. Although the through holes 25 are illustrated as circular holes, it is to be understood that virtually any cross section is possible. In case of a circular hole, a typical diameter is within the range of 0.2-3 mm. This is however to be regarded as a non-limiting example.

The at least one through hole 25 is made in a condition in which the first and the second heat exchanger plates A, B have been joined to each other to form the plate package P. Thus, the individual heat exchanger plates A, B are stacked and joined to form a plate package P, and then the through holes 25 are made. This allows a great degree of freedom when it comes to the number of through holes 25, their positions as seen in the circumferential and longitudinal extension L of the inlet channel 9 and also, their positions in view of the overlapping area of the lap joint 22. The latter is essential in terms of the thickness of material to penetrate.

Accordingly, the individual heat exchanger plates A, B as such must not be custom made in terms of the number and the position of the through holes 25. Rather, the heat exchanger plates A, B may be off the shelf products. Further, there is no risk that any pre-made through holes are blocked by solder, adhesive, welding material or the like during the joining process.

The through holes 25 are preferably made by a thermal process using a laser beam process, an electron beam process or a plasma method. Alternatively, the through holes 25 are made by a mechanical process using a punching process or a drilling process. These processes will be discussed separately below.

Figure 7:
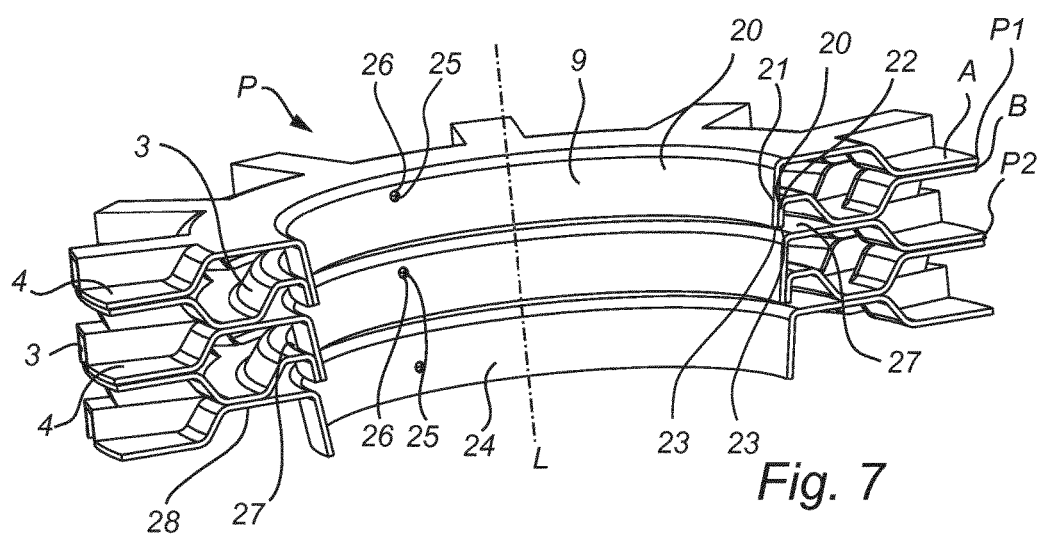

Now turning to FIG. 7, a second embodiment is disclosed. FIG. 7 discloses a portion in and around the first inlet channel 9 of a plate package P. The overall design of the plate package P as such has previously been discussed above, and to avoid undue repetition reference is made to the previous discussion.

The first and second heat exchanger plates A, B are so stacked that the peripheral rim 20 of a first heat exchanger plate A in a first pair P1 of first and second heat exchanger plates A, B is arranged in an at least partly overlapping condition with the peripheral rim 20 of the second heat exchanger plate B in the same first pair P1 of heat exchanger plates A, B. The overlapping condition thus forms a lap joint 22 extending in the circumferential direction of the inlet channel 9. Further, the lap joint 22 has a longitudinal extension essentially corresponding to the longitudinal extension L of the inlet channel 9. The free edges 23 of the peripheral rims 20 are directed essentially in the same direction in parallel with the longitudinal extension L of the first inlet channel 9.

There is no connection between the lap joint 22 of the first pair P1 of heat exchanger plates A, B and the lap joint 22 of the second, adjacent pair P2 of heat exchanger plates A, B. Thus, a small chamber 27 is defined between each pair of heat exchanger plates A, B, which chamber 27 has one open end facing the inlet channel 9. However, by a rear joint portion 28 between the adjacent first and second pairs P1, P2 of heat exchanger plates A, B, there is no communication between the chamber 27 and the first and second rearwards arranged plate interspaces 3, 4.

Accordingly, in this embodiment, the inlet channel 9 does not have an essentially smooth envelope surface 24.

A number of through holes 25 are arranged in the flanged portion 21 of the first heat exchanger plates A. The through holes 25 do each form a fluid passage 26 allowing a communication between the inlet channel 9 and the first plate interspaces 3. The at least one through hole 25 is made in a condition in which the first and the second heat exchanger plates A, B have been joined to each other to form the plate package P.

The through holes 25 may be made in a portion of the flanged portion 21 of the peripheral rim 20 having a thickness of material corresponding to the thickness of material of one single heat exchanger plate.

The through holes 25 are preferably made by a thermal process using a laser beam process or an electron beam process. Alternatively, the through holes 25 are made by a mechanical process using a punching process or a drilling process. These processes will be discussed separately below.

Figure 8:
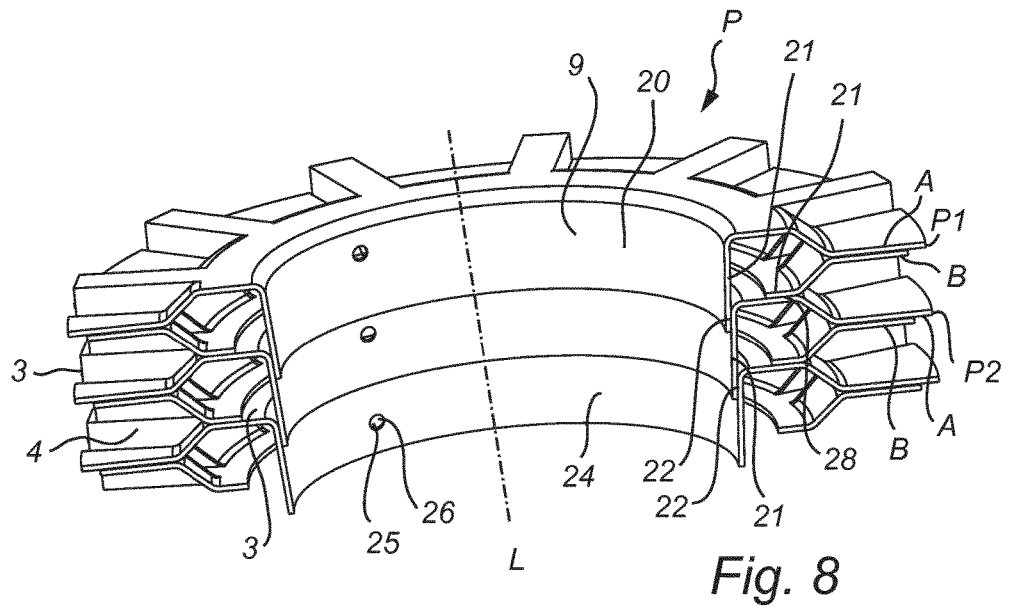

Now turning to FIG. 8, a third embodiment is disclosed. FIG. 8 discloses a portion in and around the first inlet channel 9 of a plate package P. The overall design of the plate package P as such has previously been discussed above, and to avoid undue repetition reference is made to the previous discussion.

The peripheral rim 20 of the first heat exchanger plate A has a flanged portion 21 extending essentially in parallel with the longitudinal extension L of the inlet channel 9. The peripheral rim 20 of the second heat exchanger plate B has a flanged portion 21 extending essentially perpendicular to the longitudinal extension L of the inlet channel 9.

The first and second heat exchanger plates A, B are so stacked that the flanged portion 21 of the first heat exchanger plate A in a first pair P1 of first and second heat exchanger plates A, B is arranged in an at least partly overlapping condition with the corresponding flanged portion 21 of the first heat exchanger plate A in the second adjacent pair P2 of first and second heat exchanger plates A, B. Thus, the flanged portions 21 of two successive first heat exchanger plates A, B form a lap joint 22 extending essentially in parallel with the longitudinal extension L of the first inlet channel 9. Further, the lap joint 22 extends in the circumferential direction of the inlet channel 9. This results in an essentially smooth envelope surface 24 of the first inlet channel 9.

Further, the flanged portion 21 of the second heat exchanger plate B in a first pair P1 of first and second heat exchanger plates A, B is arranged to abut and join with a portion 28 of the peripheral rim 20 of the first heat exchanger plate A in a second adjacent pair P2 of first and second heat exchanger plates A, B. The portion 28 is arranged essentially perpendicular to the longitudinal extension L of the inlet channel 9. The portion 28 together with the lap joint 22 do both provide tight joints defining the first plate interspace 3.

A number of through holes 25 are arranged in the flanged portion 21 of the peripheral rim 20 of the first heat exchanger plates A. The through holes 25 do each form a fluid passage 26 allowing a communication between the inlet channel 9 and the first plate interspaces 3. The at least one through hole 25 is made in a condition in which the first and the second heat exchanger plates A, B have been joined to each other to form the plate package P.

In this embodiment, the through holes 25 are made in a portion of the flanged portion 21 of the peripheral rim 20 having a thickness of material corresponding to the thickness of material of one single heat exchanger plate A, B.

The through holes 25 are preferably made by a thermal process using a laser beam process or an electron beam process. Alternatively, the through holes 25 are made by a mechanical process using a punching process or a drilling process. These processes will be discussed separately below.

Figure 9:
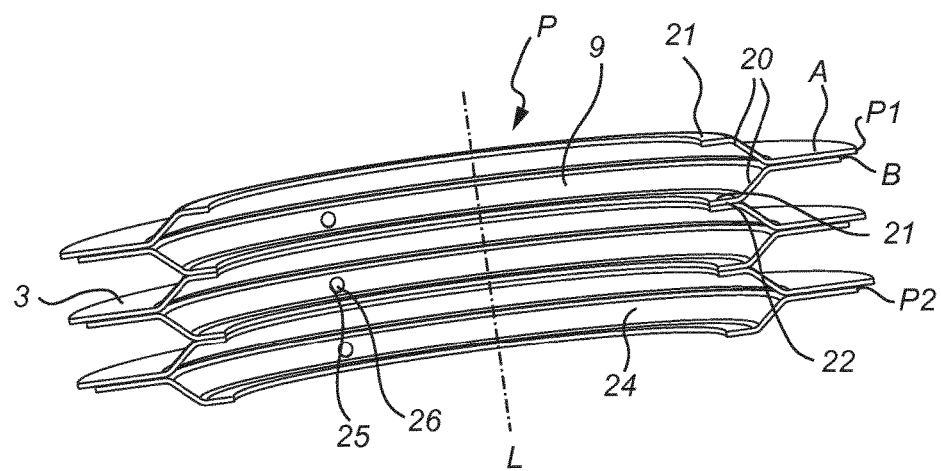

Now turning to FIG. 9, a fourth embodiment is disclosed. FIG. 9 discloses a portion in and around the first inlet channel 9 of a plate package P. Further, FIG. 9 only discloses a portion of the first plate interspace 3. The overall design of the plate package P as such has previously been discussed above, and to avoid undue repetition, reference is made to the previous discussion.

The peripheral rims 20 of the first and the second heat exchanger plates A; B have each a flanged portion 21 extending in a plane essentially perpendicular to the longitudinal extension L of the inlet channel 9. The two flanged portions 21 are arranged to abut and join each other and form a lap joint 22.

The first and second heat exchanger plates A, B are so stacked that the flanged portion 21 of the peripheral rim 20 of the first heat exchanger plate A in a first pair P1 of first and second heat exchanger plates A, B is arranged in an at least partly overlapping condition with the corresponding flanged portion 21 of the peripheral rim 20 of the second heat exchanger plate B in the first pair P1 of first and second heat exchanger plates A, B. Thus, the flanged portions 21 of the first and second heat exchanger plates A, B forming a pair P1 form a lap joint 22 extending essentially perpendicular to the longitudinal extension L of the first inlet channel 9. Further, the lap joint 22 extends in the circumferential direction of the inlet channel 9. This results in an uneven, flanged envelope surface 24 of the first inlet channel 9.

A number of through holes 25 are arranged in the flanged portion 21 of the peripheral rim 20 of the first or the second heat exchanger plates A, B. The through holes 25 do each form a fluid passage 26 allowing a communication between the inlet channel 9 and the first plate interspaces 3.

In this embodiment, the through holes 25 may be made in either the first or the second heat exchanger plates A, B. Further, the through holes 25 are arranged in the flanged portion having a thickness of material corresponding to the thickness of material of one single heat exchanger plate A, B.

The at least one through hole 25 is made in a condition after in which the first and the second heat exchanger plates A, B have been joined to each other to form the plate package P.

The through holes 25 are preferably made by a thermal process using a laser beam process or an electron beam process. Alternatively, the through holes 25 are made by a mechanical process using a punching process or a drilling process. These processes will be discussed separately below.

Figure 10:
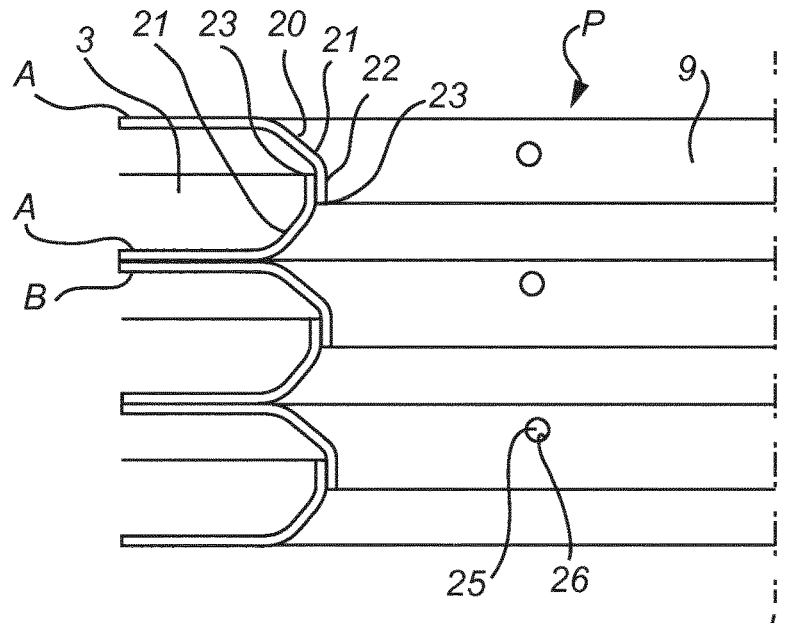
FIG. 10-11 disclose highly schematically two additional embodiments of a part of a cross section of the inlet channel of a plate package according to the invention.
Figure 11:
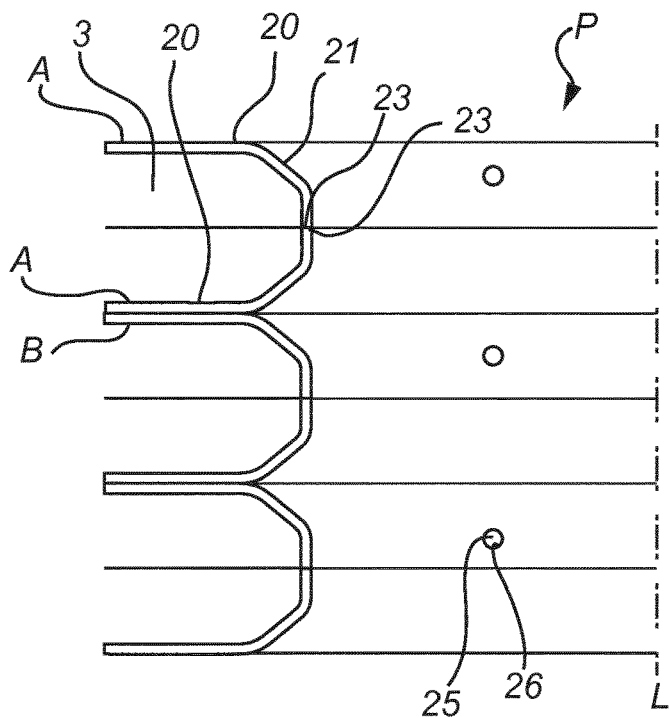

Now referring to FIGS. 10 and 11, two additional embodiments of a plate package P of the invention will be discussed. FIGS. 10 and 11 only disclose a portion of the inlet channel and are highly schematic. By way of example, they do not illustrate the first and second plate interspaces. The overall design of the plate package P as such has previously been discussed above, and to avoid undue repetition reference is made to the previous discussion.

In the disclosed embodiments, the peripheral rims 20 of the first and the second heat exchanger plates A, B have each a flanged portion 21 extending in a plane essentially in parallel with the longitudinal extension L of the inlet channel 9. In FIG. 10, the free edges 23 of the flanged portions 21 are arranged in opposite directions facing each other and also joined with each other in an at least partial overlapping condition, forming a lap joint 22. In FIG. 11, the free edges 23 of the flanged portions 21 are arranged in opposite directions facing each other and joined with each other in an abutting relationship, edge to edge. Thus, they form a butt joint.

In line with the embodiments discussed above, a number of through holes 25 are arranged in the flanged portion 21 of the peripheral rim 20 of the first or the second heat exchanger plates A, B. The through holes 25 do each form a fluid passage 26 allowing a communication between the inlet channel 9 and the first plate interspaces 3. The at least one through hole 25 is made in a condition in which the first and the second heat exchanger plates A, B have been joined to each other to form the plate package P. The through holes 25 are preferably made be by a thermal process using a laser beam process or an electron beam process. Alternatively, the through holes 25 are made by a mechanical process using a punching process or a drilling process. These processes will be discussed separately below.

Figure 12:
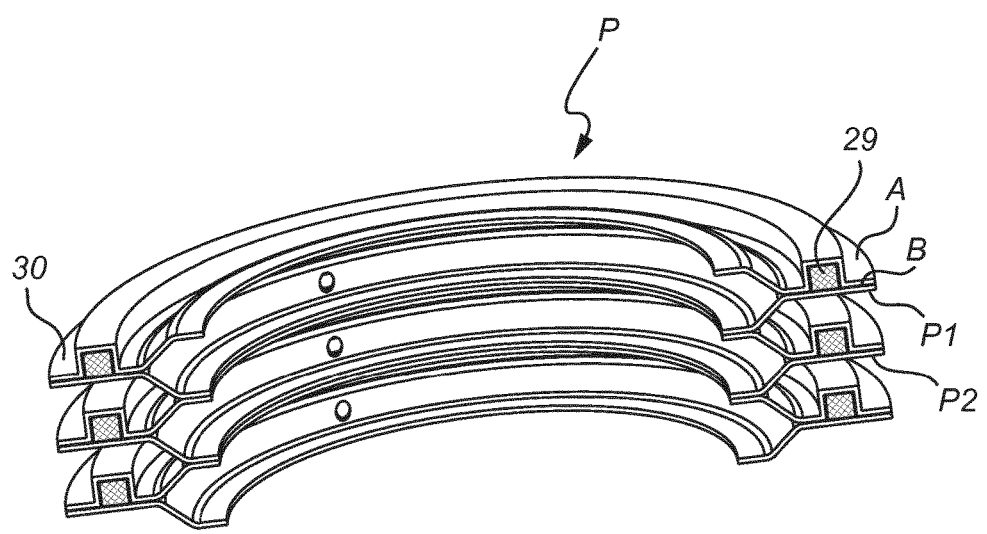
FIG. 12 discloses highly schematically the invention applied to a so called semi-welded or semi-bonded plate package.

Now referring to FIG. 12, the invention is disclosed as applied to a so called semi-welded or semi-bonded plate package. The disclosed embodiment is based on a plate package P having an overall design corresponding to that previously disclosed in FIG. 9. The difference lies in that the heat exchanger plates A, B included in the plate package are pair-wise permanently joined, wherein each pair P1, P2 forms a cassette 30. Further, a gasket 29 is arranged between each cassette 30.

In the following the hole making processes mentioned will be discussed. As given above, the through holes 25 are preferably made by a thermal process using a laser beam process or an electron beam process. Alternatively, the through holes 25 are made by a mechanical process using a punching process or a drilling process.

Starting with the laser, a laser beam process, also known as laser beam machining (LBM) is a machining process in which a beam of highly coherent light, called a laser beam, is directed towards the work piece. Since the rays of a laser beam are monochromatic and parallel, the beam it may be focused to a very small diameter and produce a very high energy content at a strictly limited area. There are a number of lasers available, well known to the skilled person, such as $CO_2$-laser, neodymium laser (Nd-laser) and neodymium yttrium-aluminium-garnet (Nd-YAG)-lasers.

During the hole making process, a numerically controlled head 100 (see FIG. 3) comprising optics and mirrors (not shown) is inserted into and moved along the interior of the inlet channel, whereby a plurality of through holes may be made by directing the laser beam to an intended position of the hole to be made. The hole making may be seen as a drilling or cutting operation. It is possible to use a so called pulsed laser, in which a high-power burst of energy is provided for a short period. Provided any cooling is required, this may be provided.

Laser drilling of cylindrical holes generally occurs through melting and/or vaporization (also referred to as ablation) of the work piece material through absorption of energy from the laser beam. Thus, the laser beam process offers a hole making process essentially free of chips formation and there is accordingly no risk that that chips are collected inside the plate package risking future operation problems.

As an alternative method, it is possible to use electron beam machining (EBM). EBM is a process where high-velocity electrons concentrated into a narrow beam are directed towards the work piece, creating heat which melts and/or vaporizes the material. EBM may be used for very accurate cutting or drilling. As the electrons transfer their kinetic energy into heat in a very small volume, the material impacted by the beam is evaporated in very short time. During the hole making process, a numerically controlled head 100 (see FIG. 3) comprising the required nozzle (not shown) is inserted into and moved along the interior of the inlet channel of the plate package, whereby a plurality of through holes may be made with very high accuracy.

Plasma cutting or plasma drilling is a method using a plasma torch. In the process, an inert gas, in some units compressed air, is blown at high speed out of a nozzle. At the same time an electrical arc is formed through the gas from the nozzle to the surface being cut. This turns some of the gas into plasma. The plasma is sufficiently hot to melt the metal being cut and also it moves sufficiently fast to blow molten metal away from the cut. During the hole making process, a numerically controlled head 100 (see FIG. 3)

comprising the required nozzle (not shown) is inserted into and moved along the interior of the inlet channel of the plate package, whereby a plurality of through holes may be made with very high accuracy.

In the embodiments given above, the number, the size, the geometry and the position of the through holes 25 have been illustrated highly schematically. The through holes 25 have been illustrated as circular holes, but it is to be understood that other geometries are possible.

Since the at least one through hole 25 is made in a condition in which the first and the second heat exchanger plates A, B have been joined to each other to form the plate package P, a great flexibility is offered. Heat exchanger plates off the shelf may be used to form the plate package P, and then the resulting plate package P may be custom made in terms of number, size, geometry and position of the through holes 25 distributing the fluid from the inlet channel 9 to the individual first plate interspaces 3.

This offers new possibilities allowing a very high flexibility. By way of example, the plate package P may be dimensioned in terms of the number of heat exchanger plates A, B and the type of heat exchanger plates depending on the intended use of the heat exchanger and depending on the dimensioned efficiency. Throughout this process, off the shelf heat exchanger plates may be used. Then, the plate package P may be put together and be joined by any desired method such as brazing, welding, adhesive or bonding. The resulting plate package P is then subjected to the thermal process using a laser beam process, an electron beam process or a plasma process wherein a custom specific pattern of through holes 25 is made. The hole pattern may be made with high accuracy by using numerically controlled operation. The hole pattern may be based on calculations or simulations of the flow of fluid based on the specific custom needs.

One of the problems to be solved when designing a plate heat exchanger is the provision of an even distribution of the fluid inside the inlet channel and into the individual first plate interspaces, and also to allow an even distribution within the individual plate interspaces in order to use the available heat transfer surface of the heat exchanger plates as effective as possible. The distribution into the first plate interspaces is provided by the through holes and it is to be understood that the distribution of the through holes around and along the circumferential envelope surface of the inlet channel may vary from one heat exchanger to another depending on the customer's needs. It is also to be understood that the distribution may even vary within one and the same plate package as seen along the longitudinal direction of the inlet channel.

Thus, following the complexity of the position and distribution of the through holes, the fact that the through holes now, by the invention, are made once the plate package has been formed and joined, offers completely new possibilities in the design of a plate heat exchanger based on custom specific needs and optimization of the efficiency.

The invention has been illustrated and disclosed throughout this document with the port holes 8 and thereby also the first inlet channel 9 arranged in the corners of rectangular heat exchanger plates A, B. It is however to be understood that also other geometries and positions are possible within the scope of protection. Also, the port holes 8 have been illustrated and disclosed as circular holes. It is to be understood that other geometries are possible within the scope of the protection.

It is to be understood that the invention is applicable also to plate heat exchangers of the type (not disclosed) where a plate package is kept together by tie-bolts extending through the heat exchanger plates and the upper and lower end plates. In the latter case gaskets may be used between the heat exchanger plates.

The plate heat exchanger may be provided with several inlet and outlet channels, whereas the shape and location of the channels may be freely chosen. For instance, the plate heat exchanger may be a dual circuit heat exchanger for three different fluids having six ports. In the latter case not every heat exchanger plate or every second heat exchanger plate and its related rim is provided with at least one through hole but rather each fourth heat exchanger plate, Accordingly, although the invention has been exemplified above as each individual heat exchanger plate or every second heat exchanger plate and their related rims are provided with at least one through hole, it is to be understood that this must not be the case. Rather, it is to be understood that the trough holes should be arranged in a rim providing access to a plate interspace intended to receive the fluid to be fed through the actual inlet channel being formed by the rims of a plurality of mutually joined heat exchanger plates.

Although the hole making process has been described as a thermal process using laser, electron beam or plasma, it is to be understood that it is possible to use also a water jet method, with or without abrasives or even a mechanical hole making process such as punching or drilling.

In the disclosed embodiments, the plate packages exhibits one and the same joint type along the full extent of the inlet channel. It is to be understood that an inlet channel of a plate package may exhibit a combination of different joint types, i.e. a mixture of lap joints and butt joints.

From the description above follows that, although various embodiments of the invention have been described and shown, the invention is not restricted thereto, but may also be embodied in other ways within the scope of the subject-matter defined in the following claims.

The invention claimed is:

1. A method of making a plate package for a plate heat exchanger, the method comprising;
   providing a number of first heat exchanger plates and a number of second heat exchanger plates, each heat exchanger plate having a first porthole, wherein said port hole of at least one of the heat exchanger plates is surrounded by a peripheral rim,
   arranging the first heat exchanger plates and the second heat exchanger plates side by side in an alternating order in which, the peripheral rims together define an inlet channel extending through the first and the second heat exchanger plates,
   joining said first and second heat exchanger plates with each other to form the plate package, and
   making, in a condition in which the first and the second heat exchanger plates have been joined to each other, at least one through hole in the peripheral rim of at least one of the first heat exchanger plate and the second heat exchanger plate.

2. A method of making a plate package according to claim 1, wherein the at least one through hole is made by a thermal process using a laser beam process, an electron beam process or a plasma process.

3. A method of making a plate package according to claim 1, wherein the at least one through hole is made by a mechanical process using a punching process or a drilling process.

4. A method of making a plate package for a plate heat exchanger, the method comprising:

arranging a plurality of first heat exchanger plates and a plurality of second heat exchanger plates side by side in an alternating order, each heat exchanger plate including a first porthole surrounded by a flanged portion of the respective heat exchanger plate to form a peripheral rim, the arranging of the plurality of first and second heat exchanger plates comprising arranging the first and second heat exchanger plates so that the peripheral rims together define an inlet channel extending through the first and the second heat exchanger plates;

joining the first and second heat exchanger plates with each other to produce the plate package in which first and second plate interspaces are formed in an alternating order between adjacent pairs of the first and second heat exchanger plates; and forming a through hole in the peripheral rim of several of the first heat exchanger plates to form a fluid passage in the peripheral rim of each of the several first heat exchanger plates that allows communication between the inlet channel and the first plate interspaces, the forming of the through hole in the peripheral rim of several of the first heat exchanger plates occurring after the first and the second heat exchanger plates have been joined to each other.

5. A method of making a plate package according to claim 4, wherein the through holes are made by a thermal process using a laser beam process, an electron beam process or a plasma process.

6. A method of making a plate package according to claim 4, wherein the through holes are made by a mechanical process using a punching process or a drilling process.

* * * * *